United States Patent [19]

Saeki

[11] 4,151,934

[45] May 1, 1979

[54] FIXED VOLUME DISCHARGE DEVICE

[76] Inventor: Noriyoshi Saeki, 10-34, Umezawacho-2-chome, Toyama-shi, Japan

[21] Appl. No.: 841,559

[22] Filed: Oct. 12, 1977

[30] Foreign Application Priority Data

Nov. 2, 1976 [JP] Japan .......................... 51-147855[U]
Nov. 2, 1976 [JP] Japan .......................... 51-147856[U]
Nov. 12, 1976 [JP] Japan .............................. 51-152487
Dec. 13, 1976 [JP] Japan .............................. 51-166915
Dec. 13, 1976 [JP] Japan .............................. 51-166916

[51] Int. Cl.$^2$ ............................................ G01F 11/26
[52] U.S. Cl. ................................. 222/437; 222/440; 222/455
[58] Field of Search ............... 222/437, 440, 454, 455, 222/456, 457, 547, 564

[56] References Cited

U.S. PATENT DOCUMENTS

| | | | |
|---|---|---|---|
| 1,297,244 | 3/1919 | Raven | 222/455 |
| 2,091,929 | 8/1937 | Kappenberg | 222/455 |
| 2,428,233 | 9/1947 | Livapas | 222/455 |
| 2,752,076 | 6/1956 | Locker | 222/455 |
| 3,587,943 | 6/1971 | Van Hulsel | 222/455 |

Primary Examiner—Robert J. Spar
Assistant Examiner—Fred A. Silverberg
Attorney, Agent, or Firm—Jay L. Chaskin

[57] ABSTRACT

A fixed volume discharge device adapted to be mounted to a container, and having a first chamber communicating with the interior of the container and a second chamber communicating with the atmosphere, the first chamber and the second chamber communicating with each other through a restricted opening. A liquid or powder stored in the container flows into the first chamber when the container is downwardly inclined, and then flows into the second chamber from the first chamber when the container is returned in its normal attitude. Thus, when the container is again downwardly inclined, the liquid or the powder within the second chamber is discharged while the liquid or the powder in the container flows into the first chamber, thereby a predetermined fixed volume liquid or powder is obtainable through the fixed volume discharge device each time the container is downwardly inclined. The fixed volume discharge device is adjustable in the amount of its predetermined discharge volume, and has a size and shape suitable for a container such as a bottle to which the fixed volume discharge device is mounted.

7 Claims, 34 Drawing Figures

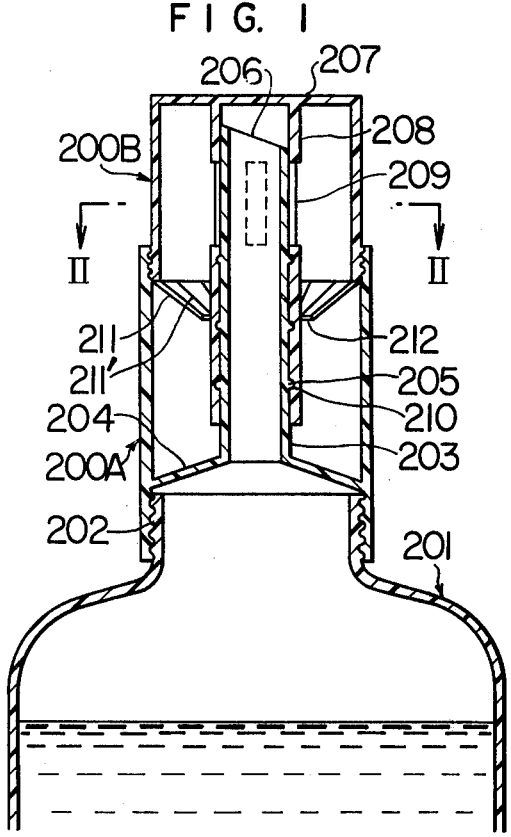
FIG. 1
FIG. 2
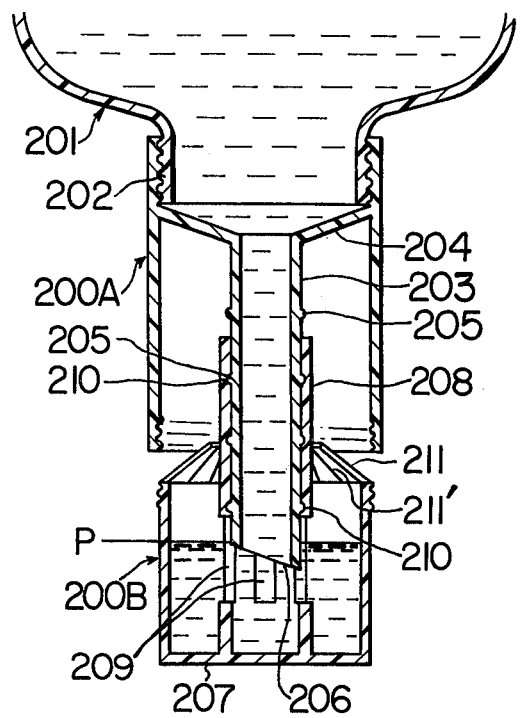
FIG. 3
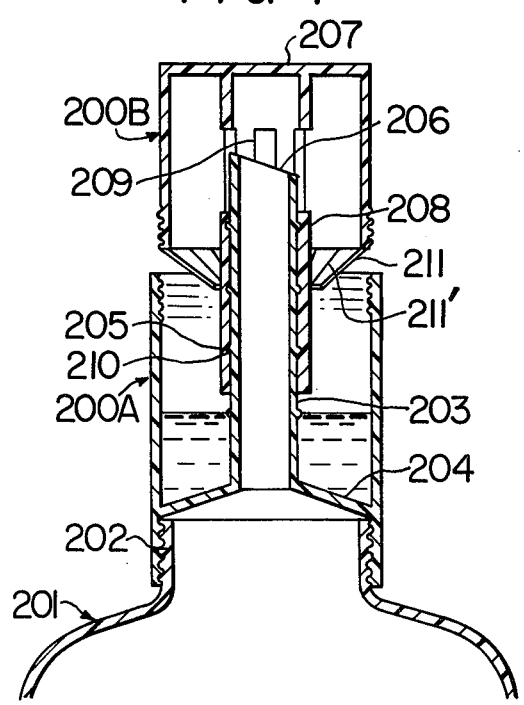
FIG. 4

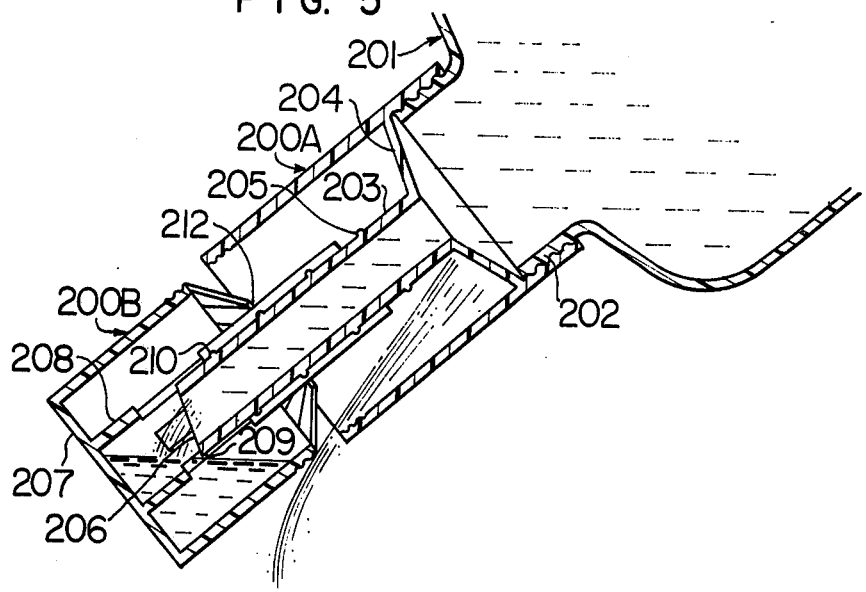
F I G. 5
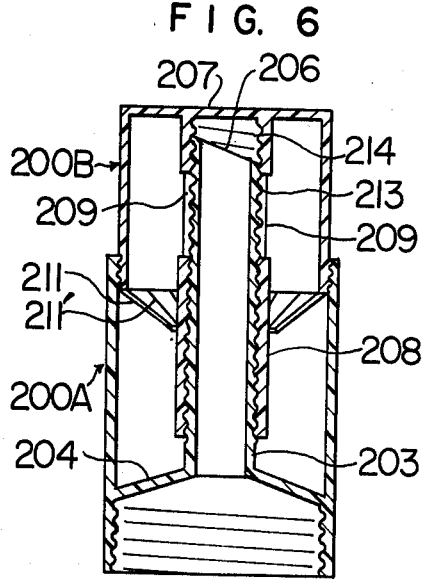
F I G. 6
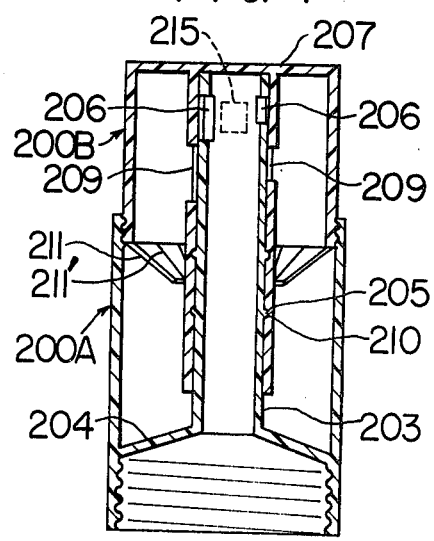
F I G. 7

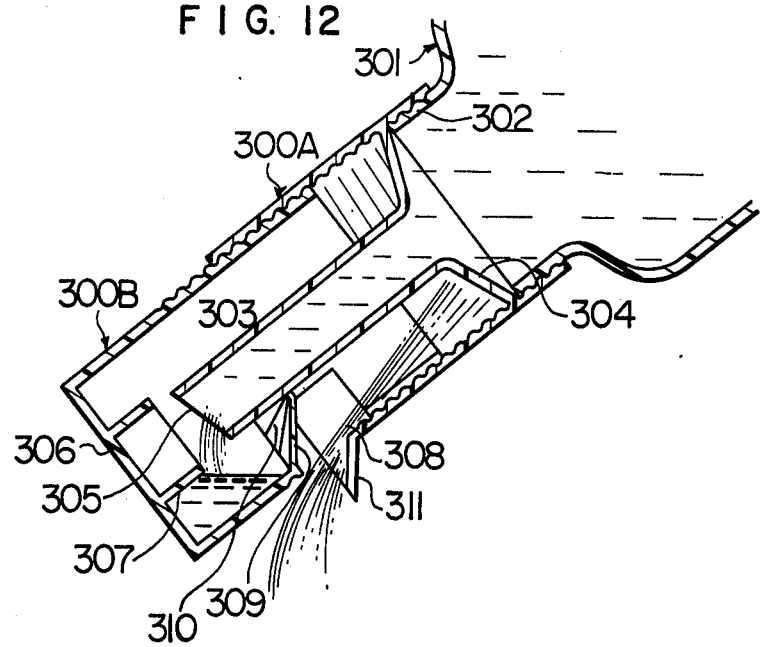
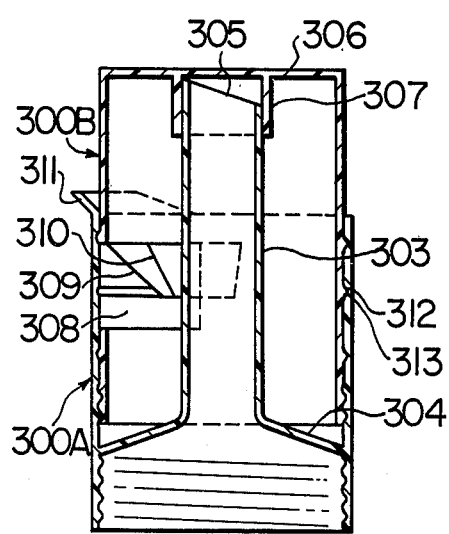
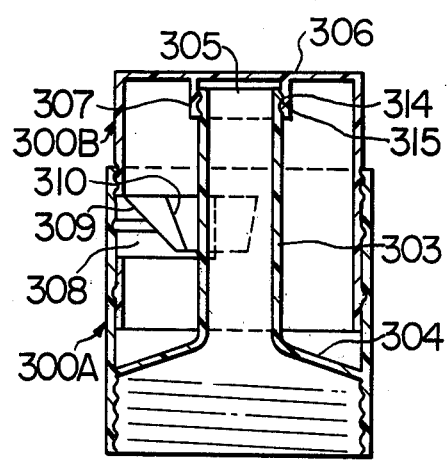

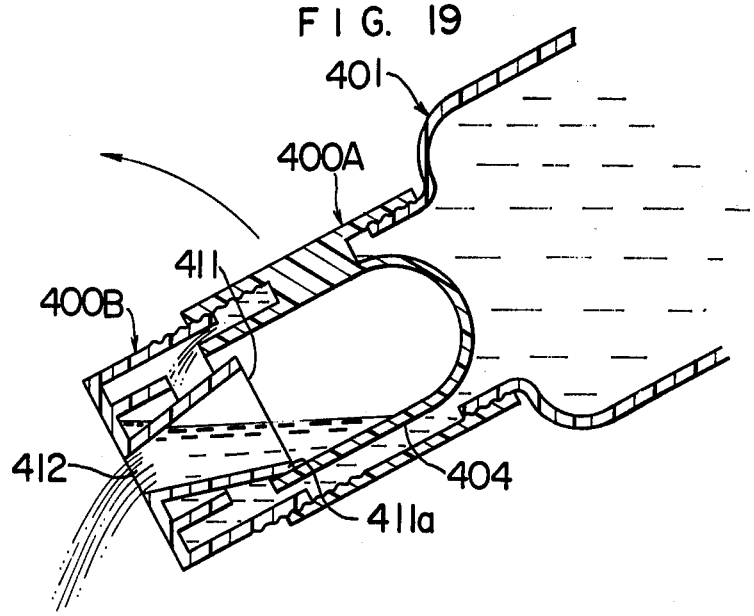
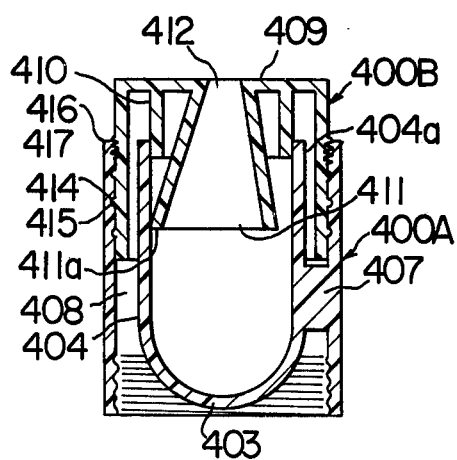 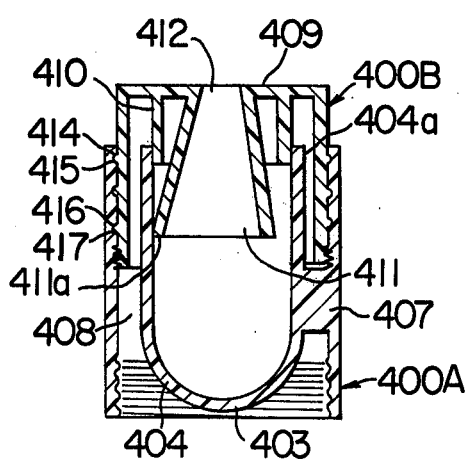

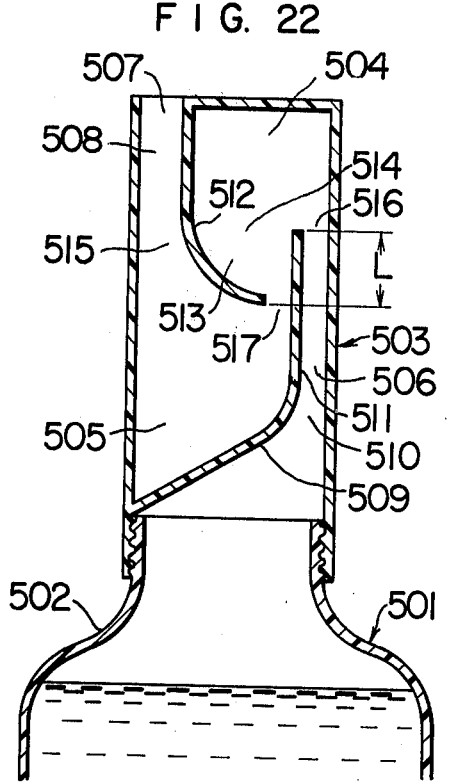
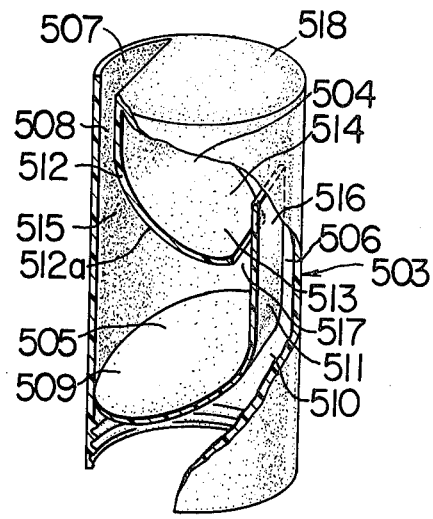
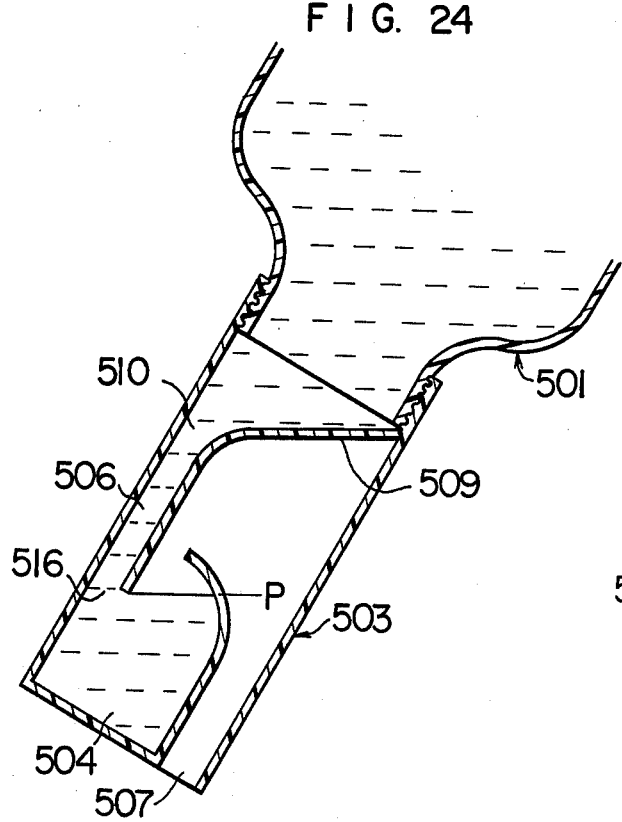
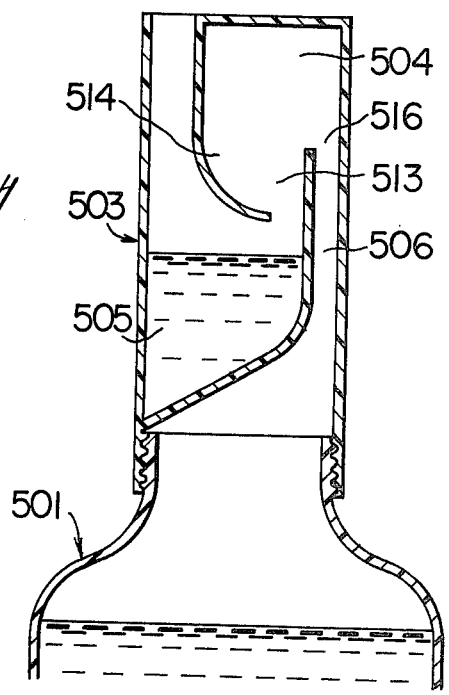

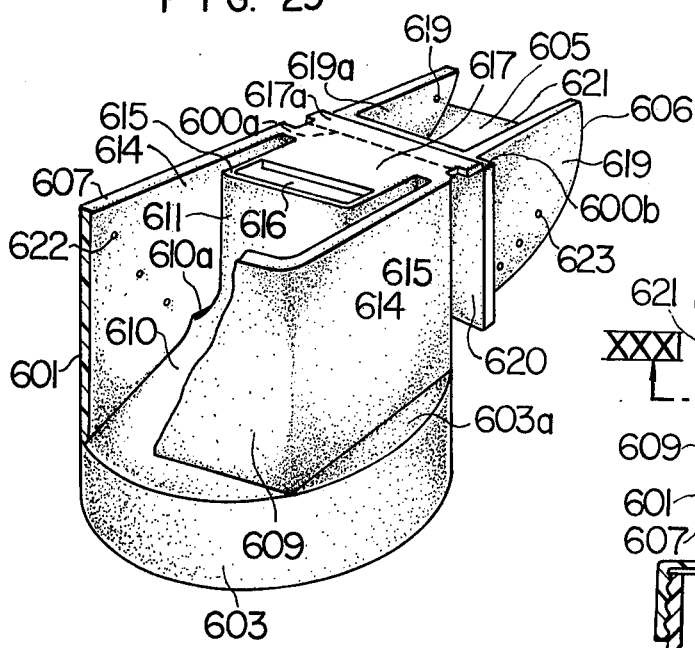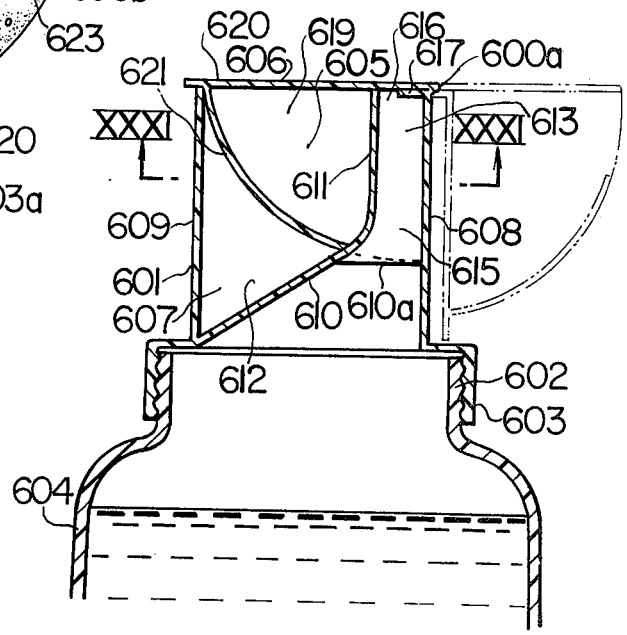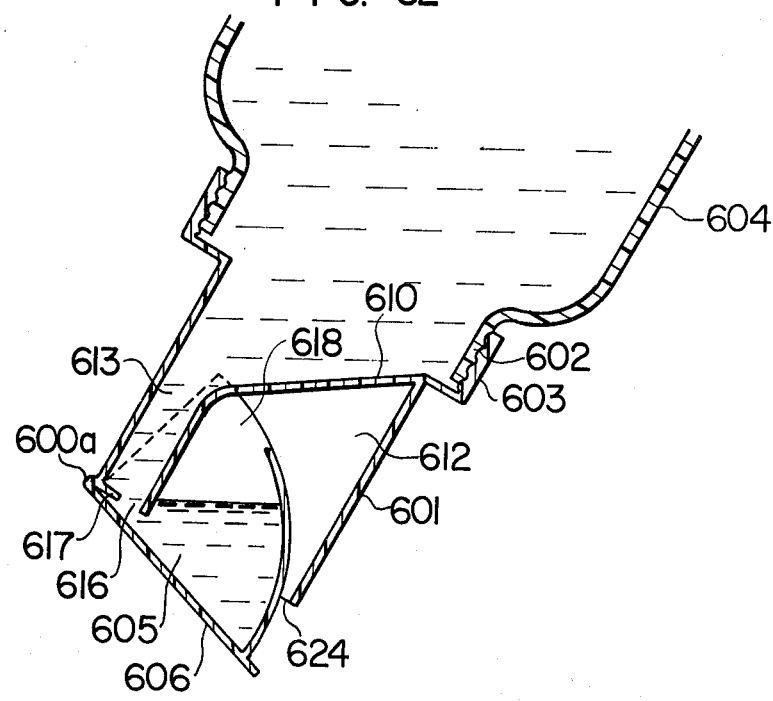

FIXED VOLUME DISCHARGE DEVICE

The invention relates to a fixed volume discharge device adapted to be mounted to a container, and is particularly concerned with the fixed volume discharge device which is preferably mounted to a bottle type container.

Heretofore, there have been known various kinds of fixed volume discharge device adapted to be mounted to a container for storing a liquid as for example a liquid soap or a powder as for example sugar. However, such kinds of devices are structurally and operationaly complicated.

In our U.S. Pat. application No. 822,366, we proposed a fixed volume discharge device wherein a predetermined fixed volume of a liquid or a powder in a container, which is referred as the content herein after, is discharged through the fixed volume discharge device each time the container is downwardly inclined.

The construction of the fixed volume discharge device comprises a cap portion adapted to be fitted to the opening of a container, a first chamber having a narrow opening through which the content in the container flows into the first chamber when the container is downwardly inclined, a partition wall provided with holes which are positioned above the narrow opening at a predetermined distance when the container takes its normal attitude, and a second chamber having a discharge opening and communicating with the first chamber through the holes provided in the partition wall which divides the first chamber and the second chamber.

There are disadvantages in the fixed volume discharge device disclosed in the above patent application. It is difficult to have the overall diameter of the device reduced, since the device has such a structure that the first chamber is annularly surrounded by the second chamber. Further, in the fixed volume discharge device it is structurally difficult to alter the amount of the fixed discharge volume.

In the case of a bottle type container, the fixed volume discharge device of a relatively large diameter may not produce an aesthetic impression on the sense of sight of the user. Further, it may sometime be preferable to alter the amount of the fixed discharge volume. In these cases, the device disclosed in the above U.S. Patent application is unsuitable.

It is an object of the invention to provide an improved fixed volume discharge device which eliminates the above mentioned disadvantages.

It is another object of the invention to provide a fixed volume discharge device having a relatively small overall diameter.

Further, it is another object of the invention to provide a fixed volume discharge device which is adjustable in the amount of its fixed discharge volume.

According to one aspect of the invention, there is provided a fixed volume discharge device comprising a first chamber communicated with the interior of a container through a passage, and a second chamber communicated to the atmosphere through outlet means and arranged below the first chamber so that the content trapped within the first chamber flows down to the second chamber when the container is returned to its normal attitude from its downwardly inclined condition.

According to another aspect of the invention, there is provided a fixed volume discharge device comprising an outer lower cap adapted to be sealingly fitted onto the neck portion of a container, a conduit provided in the outer lower cap, and an over cap cooperably engaged with the outer lower cap, the over cap defining the first chamber therein and the outer lower chamber defining the second chamber therein, the first chamber communicating with the interior of the container through the conduit.

Further, according to another aspect of the invention, there is provided a fixed volume discharge device wherein in the above mentioned over cap is movable relative to the outlet end of the conduit which outlet end determines the content level trapped within the first chamber when the container is turned upside down, thereby it is possible to alter the discharge volume by changing the position relative to the outlet end of the conduit, since the trapped volume of the content within the first chamber corresponds to the discharge volume through the fixed volume discharge device.

According to an embodiment of the invention, the over cap is threadedly engaged with the outer lower cap so as to be possible to continuously adjust the discharge volume.

According to the other embodiment of the invention, the over cap is snap-engaged with the outer lower cap by means of projections and the associated recesses so as to be possible to steppedly adjust the discharge volume.

Other features and advantages of the invention will be apparent from the following description taken in connection with the accompanying drawing, wherein:

FIG. 1 illustrates a first embodiment of the invention wherein a fixed volume discharge device and a container provided therewith are shown in a cross-sectional view;

FIG. 2 illustrates a cross-sectional view taken along line II—II of FIG. 1;

FIG. 3 is the same cross-sectional view as FIG. 1, however showing that the fixed volume discharge device and the container is turned upside down and the top portion of the fixed volume discharge device is pulled out from the bottom portion thereof;

FIG. 4 is the same cross-sectional view as FIG. 3, however showing that the fixed volume discharge device and the container take their normal attitudes;

FIG. 5 is the same cross-sectional view as FIG. 3, however showing that the fixed volume discharge device and the container is downwardly inclined;

FIG. 6 illustrates the first modification of the first embodiment in a cross-sectional view;

FIG. 7 illustrates the second modification of the first embodiment in a cross-sectional view;

FIGS. 8 to 12 illustrate a second embodiment of the invention in cross-sectional views;

FIG. 13 illustrates the first modification of the second embodiment in a cross-sectional view;

FIG. 14 illustrates the second modification of the second embodiment in a cross-sectional view;

FIGS. 15 to 19 illustrate a third embodiment of the invention in cross-sectional views;

FIG. 20 illustrates the first modification of the third embodiment in a cross-sectional view;

FIG. 21 illustrates the second modification of the third embodiment in a cross-sectional view;

FIGS. 22 to 26 illustrate a fourth embodiment of the invention in cross-sectional views, excepting FIG. 23 which illustrates in a perspective view partially broken;

FIG. 29 illustrates a fifth embodiment of the invention in a perspective view; and FIGS. 30 to 34 illustrate the fifth embodiment of the invention in cross-sectional views.

Figure 8:
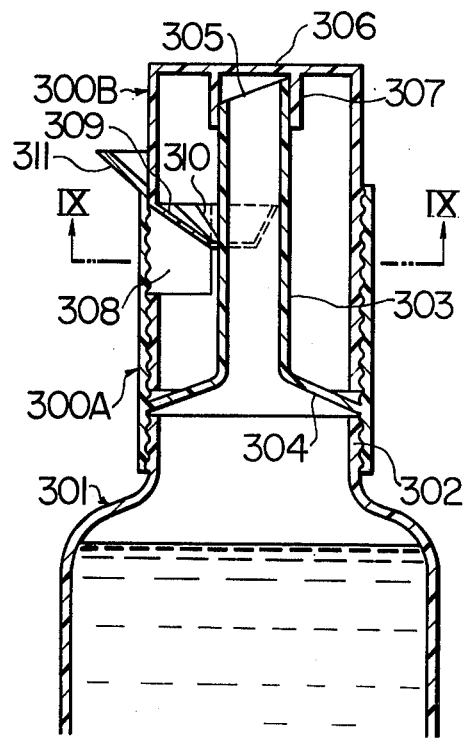

Referring to FIGS. 1 to 5, a first embodiment of the invention will be described.

A fixed volume discharge device is adapted to be threadedly engaged with the neck portion 202 of a container 201. The fixed volume discharge device comprises an outer lower cylinder 200A threadedly engaged with the neck portion 202 of the container 201 and an over cap 200B cooperating with the outer lower cylinder 200A. The outer lower cylinder 200A includes a lower wall 204 from which an inner cylinder 203 upwardly extends. The inner cylinder 203 defines therein a conducting chamber communicating with the interior of the container 201. The inner cylinder 203 is slantly cut at its upper end so as to form an opening 206 through which a smooth flow of the content may be obtained.

The lower wall 204 is sealingly connected at its periphery to the inner surface of the outer lower cylinder 200A and at its middle portion to the lower end of the inner cylinder 203.

On the outer surface of the inner cylinder 203 are provided annular projections 205 which are spaced from each other in the axial direction of the inner cylinder 203.

The over cap 200B comprises a conduit 208 having opening means 209 in the upper end portion thereof, and a conical wall 211. The conical wall 211 is sealingly connected at its large diameter end to the inner lower peripheral portion of the cylindrical wall of the over cap 200B. The conical wall 211 may be provided with slits 211' in order to ease manufacturing of the conical wall 211. The outer lower peripheral portion of the over cap 200B is provided with threaded means which is adapted to be engaged with threaded means provided on the inner peripheral portion of the outer lower cylinder 200A. The inner surface of the conduit 208 is formed with annular recesses 210 adapted to be engaged with the annular projections 205 of the inner cylinder 203 of the outer lower cylinder 200A. The inner cylinder is sealingly connected at its upper end to the top plate 207 of the over cap 200B.

The over cap 200B and the outer cylinder 200A are so assembled together with that the conduit 208 of the over cap 200B is fitted onto the inner cylinder 203 of the outer lower cylinder 200A.

The over cap 200B defines a first chamber therein and the outer lower cylinder 200A defines a second chamber therein, the second chamber being formed within the outer lower cylinder 200A between the inner surface of the lower cylinder 200A and the outer surface of the inner cylinder 203.

Between the smaller diameter end of the conical wall 211 and the outer surface of the conduit 208 is formed an annular opening 212 through which the content flows into the second chamber from the first chamber, when the container is returned to its normal attitude from the upside down state thereof.

It is to be noted that the fixed volume discharge device may be made of resilient materials so that the inner cylinder 203 is resiliently fitted into the conduit 203. Therefore, the annular projections 205 and the annular recesses 210 are easily engaged and disengaged to and from each other.

When the container 201 is not used or stored, the over cap 200B is screwed into the outer lower cylinder 200A so as to close the container 201. Since the top end of the conduit 208 is fitted onto the opening 206 of the inner cylinder 203, the content within the container 201 may not flow into the first chamber.

When the container is used, the over cap 200B is screwed out from the outer lower cylinder 200A so as to form therebetween an outlet opening through which the content may be discharged out.

When the container 201 is firstly turned upside down, the content within the container 201 flows into the first chamber through the conducting chamber inside the inner cylinder 203, the opening 206 and the opening means 209. The content level P in the first chamber, as shown in FIG. 3, determines the amount of the fixed volume to be discharged out. The level P is such that the content completely covers the opening 206.

When the container is then returned to its original position or attitude, the content trapped in the first chamber flows through the annular opening 212 into the second chamber, as shown in FIG. 4.

When the container 201 is inclined, as shown in FIG. 5, the content in the second chamber is discharged out through the outlet opening, while the content within the container 201 flows into the first chamber in the manner described above.

It should be appreciated that the engagement between the annular projections 205 and the annular recesses 210 may be altered so as to adjust the conduit level P which in turn determines the amount of the fixed volume to be discharged out.

FIG. 6 illustrates a first modification of the first embodiment wherein the inner cylinder 203 is threadedly engaged with the conduit 208. Therefore, the amount of the fixed volume to be discharged may be continuously varied.

FIG. 7 illustrates a second modification of the first embodiment wherein two openings 206 are provided in the peripheral wall of the conduit 208 which overlaps with the opening means 209 of the inner cylinder 203.

Each opening 206 has a different size one from the another. The opening means has two holes 209 each having a different size. Therefore, the two openings are alternatively overlapped each others so that the amount of the fixed volume may be precisely adjusted. In the peripheral wall of the conduit 208 is preferably provided a hole 215 in order to obtain a smooth flow of the content form the container 201 to the first chamber.

Referring to FIGS. 8 to 12, a second embodiment of the present invention will be explained.

A fixed volume discharge device according to the second embodiment, comprises an outer lower cylinder 300A similar to the cylinder 200A of the first embodiment. However, threaded means is provided on the inner peripheral surface of the outer cylinder 300A at its overall depth. The threaded means adapted to be engaged with threaded means provided on the outer peripheral surface of an over cap 300B which is substantially similar shape to the cap 200B of the first embodiment, but has a longer cylindrical wall than that of the over cap 200B. The cylindrical wall of the over cap 300B is partially cut along the periphery thereof so as to form an outlet opening 308. Along the lower edge of the opening is provided a partially conical brim 309 which extends inwardly from the lower edge of the opening 308.

An annular projection 307 is integrally incorporated with the inner surface of the top plate 306 of the over cap 300B, which annular projection 307 is adapted to be fitted onto the upper end of an inner cylinder 303 upwardly extending from a lower wall 304 sealingly connected at its periphery to the inner peripheral surface of the outer lower cylinder 300A.

Along the peripheral edge of the upper end of the outer lower cylinder is provided an outwardly extending brim 311 which cooperates with the inwardly extending brim 309 of the over cap 300B when the fixed volume discharge device is operated.

The operation of the discharge device will be explained below:

When a container 301 is not used or stored, the over cap 300B is completely screwed into the outer lower cylinder 300A so as to close the outlet opening 308. Further, the annular projection 307 is fitted onto the opening 305 so as to shut the flow of the content from the container 301.

Figure 10:
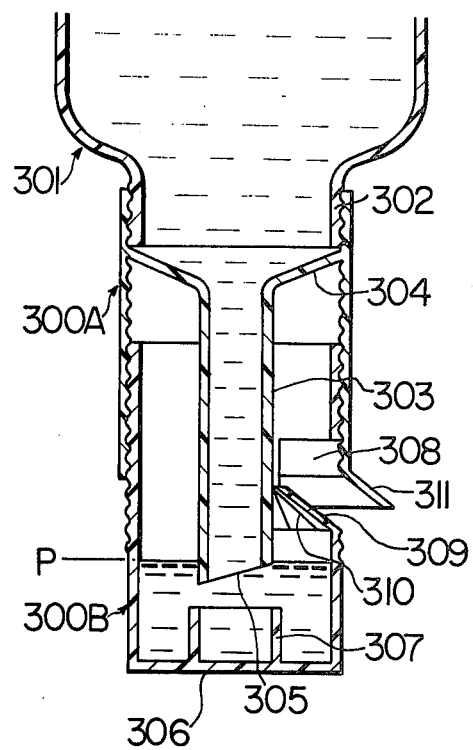

When the container 301 is used, the over cap 300B is partially unscrewed to expose the outlet opening 308. The container 301 is then turned upside down so that the content flows into a first chamber defined in the over cap 300B from the container 301 through a communication chamber inside the inner cylinder 303. When the content covers the opening 305 or reaches the level P as shown in FIG. 10, the flow of the content from the container 301 ceases. When the container 301 is returned to its normal attitude, the content within the first chamber flows down and into a second chamber defined in the outer lower cylinder 300A. Since there is an arcuate aperture defined between the inner lower edge of the inwardly extending brim 309 and the outer surface of the inner cylinder 303, the content may not be trapped by the inwardly extending brim 309. The amount of the fixed volume to be discharged is determined by the adjustment of the degree of unscrewing the over cap 300B from the outer lower cylinder 300A.

Further when the container 301 is inclined, the content within the second chamber flows out through the outlet opening 308, refer to FIG. 12, while the content from the container flows into the first chamber as mentioned above.

Figure 9:
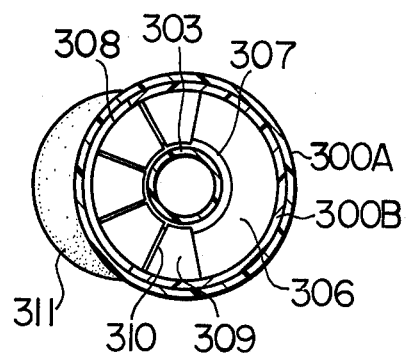
Figure 11:
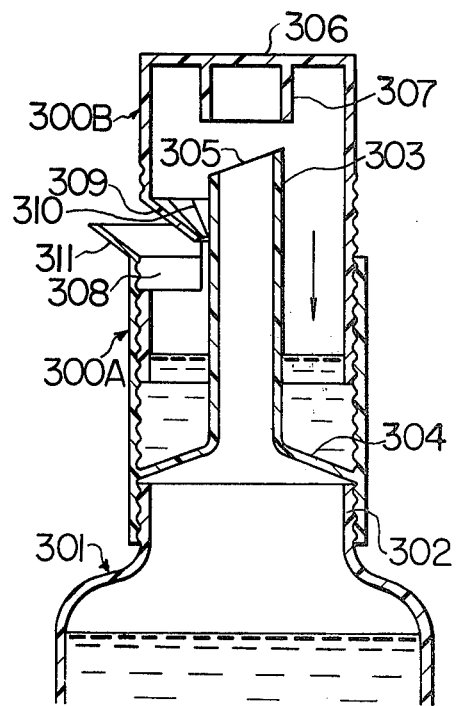
Figure 15:
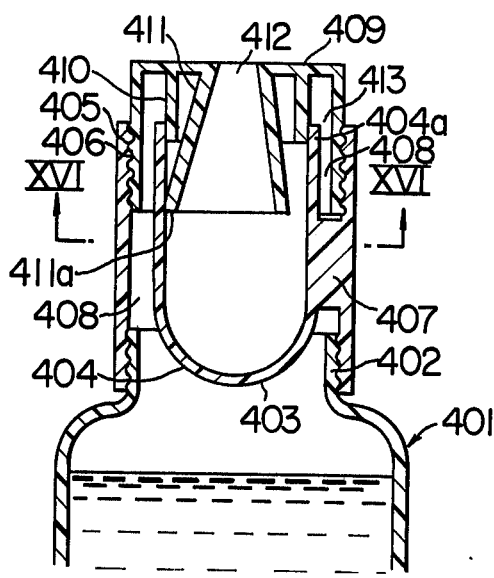
Figure 17:
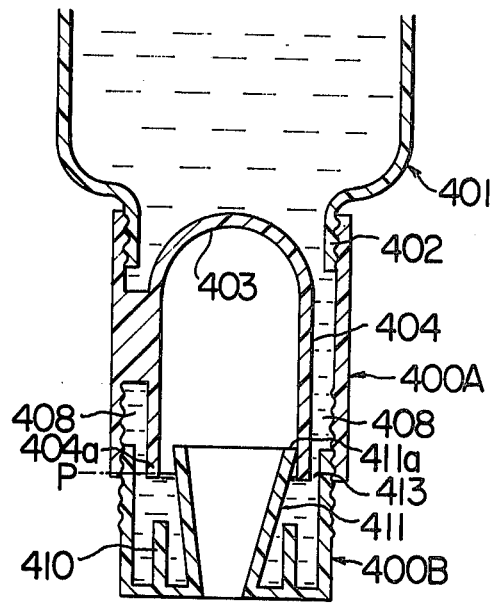
Figure 16:
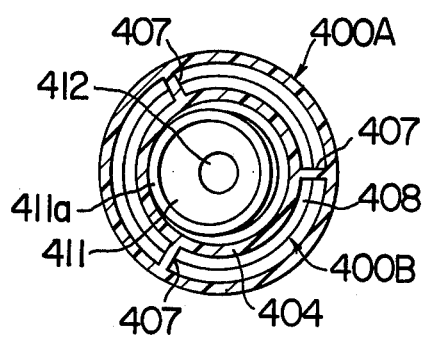

It may preferably be provided with slits 310 which is clearly shown in FIG. 9, in order to ease manufacturing the inwardly extending brim 309.

FIG. 13 illustrates a first modification of the second embodiment, instead of the threaded means, annular projections 312 and annular recesses 313 are provided on the outer peripheral surface of the cylindrical wall of the over cap 300B and on the inner peripheral surface of the outer lower cylinder 300A, respectively. However, for the locking action of the over cap 300B, the threaded means are also provided at the lowermost portion thereof.

FIG. 14 illustrates a second modification of the second embodiment wherein threaded means for the locking action are provided on the inner peripheral surface of the annular projection 307 and on the outer peripheral surface of the upper end portion of the inner cylinder 303, respectively. Further, threaded means are preferably provided on the inner peripheral surface of the outer lower cylinder 300A and on the outer peripheral surface of the cylindrical wall just above the outlet opening 308 so as to ensure the sealing of the outlet opening 308 when the latter is closed.

FIGS. 15 to 20 show the third embodiment of the present invention. Similar to the second embodiment, a fixed volume discharge device comprises an outer lower cylinder 400A and an over cap 400B. However, in this embodiment, an outlet opening 412 is formed in the center portion of the top plate 409 of the over cap 400A. A conical wall 411 inwardly extends from the peripheral edge of the outlet opening 412. Between the cylindrical wall of the over cap 400B and the conical wall 411 is defined an annular space 413 as a first chamber into which the content flows from the container 401 when the latter is turned upside down.

The outer lower cylinder 400A carries a cup shaped member 404 by means of strip members 407. The cup shaped member 404 defines therein a second chamber for receiving the content from the first chamber when the container 401 is returned to its normal attitude from the upside down state. Between the outer lower cylinder 400A and the outer peripheral surface of the cup shaped member 404 is defined an annular passage 408 through which the content flows into the first chamber from the container 401 when the latter is turned upside down.

The lower edge of the conical wall 411 defines with the inner surface of the cup shaped member 404 a restricted passage through which the content in the first chamber flows down and into the second chamber when the container 401 is returned to its normal attitude from the upside down state.

It should be noted that the lower peripheral edge of the conical wall 411 is partially connected to the inner peripheral surface of the cup shaped member 404 as denoted by reference numeral 411a. When the container 401 is further inclined to discharge the content within the second chamber, the content should flow over the part 411a and is discharged from the outlet opening 412 through the conducting chamber inside the conical wall 404.

Figure 18:
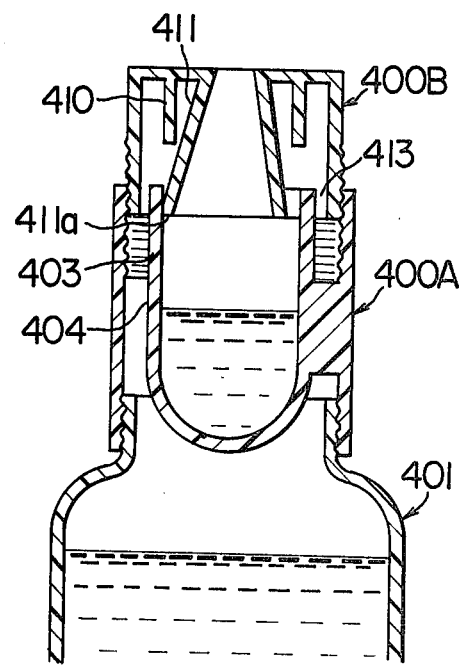
Figure 26:
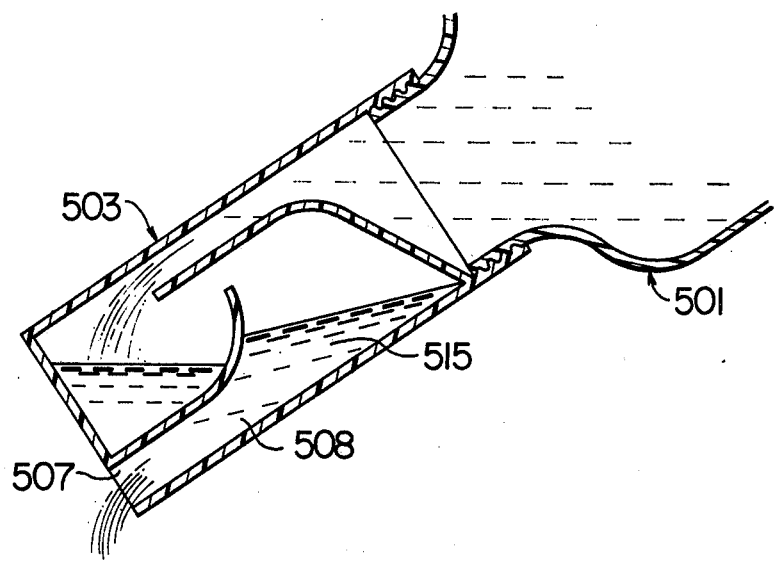

The amount of the fixed volume to be discharged is determined by the adjustment of the relative engagement position between the outer lower cylinder 400A and the over cap 400B, that is, as shown in FIG. 18, the adjustment is made by unscrewing the over cap 400B from the outer lower cylinder 400A.

An annular projection 410 is provided on the inner surface of the top plate 409. The annular projection is adapted to cooperate with the upper periphery of the cup shaped member 404 so as to shut the flow of the content from the container 401 as well as from the first chamber when the over cap 400B is completely screwed into the outer lower cylinder 400A.

FIG. 20 illustrates a first modification of the third embodiment wherein annular projections 414 and annular recesses 415 are provided on the outer peripheral surface of the cylindrical wall of the over cap 400B and on the inner peripheral surface of the outer lower cylinder 400A, respectively. Although the adjustable engagement between the over cap 400B and the outer lower cylinder 400A is made by the combination of the annular projections 414 and the annular recesses 415, threaded means are still provided in the upper portion of the above mentioned surface of the cylindrical wall of the over cap 400B and of the outer lower cylinder 400A. The threaded means provided a locking action of the over cap 400B when the latter is completely screwed into the outer lower cylinder 400A.

FIG. 21 illustrates a second modification of the second embodiment wherein threaded means for the locking action are provided to the lower portion of the both surfaces.

As far as the description of the first to third embodiments are concerned, the fixed volume discharge device consists of two components. From the view point of manufacturing the fixed volume discharge device, it may be preferable to constitute the fixed volume discharge device as one component or one unit, since the manufacturing process would be reduced to a few steps, for example, of injection-molding and of welding the molded components or members.

The fourth embodiment of the present invention is to provide a fixed volume discharge device consisting of one component or made as one unit.

Referring to FIGS. 22 to 26, the fourth embodiment of the present invention will be explained below:

A fixed volume discharge device mainly consists of a cylindrical cap having an outlet opening 507 provided in its top plate 518. The outlet opening 507 is formed in the manner that the left end portion of the top plate 518, as shown in FIGS. 22 and 23, is cut out. The outlet opening 507 is in the shape of a segment having an arcuate edge and a chordal edge.

A first wall extends downwardly from the chordal edge of the opening 507, which wall consists of a vertical wall 512 followed by an inclined wall 512a. The first wall is sealingly connected at its upper end edge to the inner surface of the top plate 518 and at its side edge to the inner peripheral surface of the cylindrical wall 503 so as to define a first chamber 504 in the right side part of the cylindrical cap with cylindrical wall 503 and the top plate 518.

The lower end portion of the inner peripheral surface of the cylindrical wall 503 of the cylindrical cap is formed with threaded means adapted to be engaged with threaded means of the neck portion 502 of a container 501. Just above the threaded means is provided an upwardly extending second wall consisting of an inclined wall 509 followed by a vertical wall 511. A second chamber 515 is defined, in the left side part of the cylindrical cap and below the first wall, by the second wall and the cylindrical wall 503. In the right side part of the cylindrical cap, the second wall defines a conducting chamber 506 through which the content from the container 501 flows into the first chamber 504 when the container is turned upside down.

The lower edge of the first wall defines with the second vertical wall 511 a restricted opening 517 through which the content within the first chamber 504 flows down and into the second chamber 515 when the container 501 is returned to its normal attitude from the upside down state.

When the container is further inclined, the content within the second chamber 505 is discharged out from the outlet opening 507 through an outlet passage defined in the left side part of the cylindrical cap by the first wall.

Figure 27:
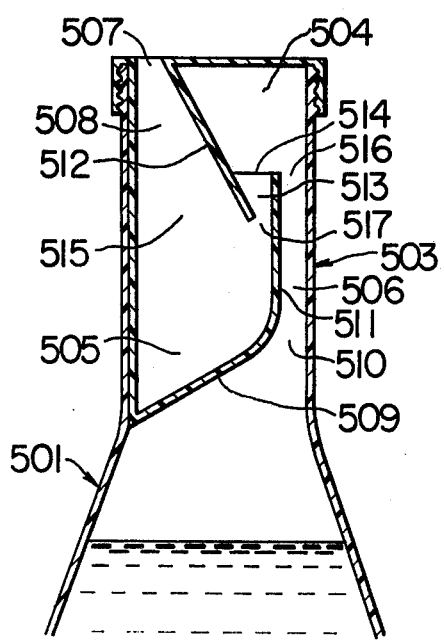
FIG. 27 illustrates the first modification of the fourth embodiment in a cross-sectional view.
Figure 28:
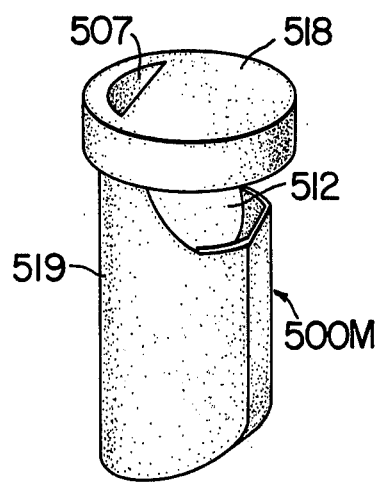
FIG. 28 illustrates the first modification of the fourth embodiment in a perspective view.

FIGS. 27 and 28 illustrate a first modification of the fourth embodiment. This modified fixed volume discharge device is entirely inserted into the neck portion 502 of the container 501.

In this modification, the cylindrical cap has a relatively short cylindrical wall inside of which is provided threaded means adapted to be engaged with threaded means provided on the outer peripheral surface of the neck portion of the container. The first chamber 504 is defined between a first inclined wall 512 downwardly extending from the chordal edge of the outlet opening 507 and the inner peripheral surface of the neck portion of the container. The second chamber 505 is defined by a surrounding wall 519 and an upwardly extending second wall consisting of an inclined wall 509 and a vertical wall 511. The surrounding wall 519 is sealingly connected at its top end to the arcuate edge of the outlet opening 507, at its side edges to the both side edges of the vertical wall 511, and its bottom edge to the both side edges of the inclined wall 509.

The first inclined wall 512 is sealingly connected at its top edge to the chordal edge of the outlet opening 507 and its side edges to the inner surface of the surrounding wall 519.

The other parts of the device and the operation of the device are the same as that of the fourth embodiment. Therefore, the detailed explanation of the device is not given.

FIGS. 29 to 34 illustrate the fifth embodiment of the present invention.

A fixed volume discharge device according to the fifth embodiment mainly consists of three portions: a cylindrical cap portion 603, a box portion 601 and a cover portion 606.

The cylindrical cap portion 603 is provided with threaded means on its inner peripheral surface so as to be threadedly engaged with the neck portion 602 of the container 604. The top plate 603a of the cap portion 603 defines a square opening therein. The box portion 601 is sealingly connected at all of its bottom edges to the respective edges of the square opening. From one edge of the square opening, an inclined wall 610 to which is attached a horizontal wall 610a, extends upwardly. The inclined wall 610 and the horizontal wall 610a are sealingly connected at their side edges to the opposed lateral walls of the box portion 601. The horizontal wall 610a has a large cut out so as to form a rectilinear opening. The inclined wall 610 further upwardly extends from the front edge of the rectilinear opening, however, the inclined wall 610 is slightly cut at its both sides above the rectilinear opening. The width of the inclined wall above the rectilinear opening is the same as that of the rectilinear opening. The inclined wall 610 is followed by a vertical wall 611. Side plates 615 respectively cover apertures each of which is defined between the rear wall of the box portion 601 and the side edges of the inclined and vertical walls 610, 611. Each laterial plate 615 defines a gap 614 with the lateral wall of the box portion 601. The upper edges of the both lateral plates 615 are respectively connected to the side edges of a sealing plate 617 horizontally extending from the upper edge of the rear wall of the box portion 601.

The sealing plate 617 is so arranged as to form an opening 616 with the upper edges of the vertical wall 611 and of both lateral plates 615. The sealing plate 617 outwardly and horizontally extends from the upper edge of the rear wall of the box portion 601. The sealing plate 617 is connected to a strip 617a by means of a first hinged flexible thin wall 600a. The strip 617a is further connected to the cover plate 620 of the cover portion 616 by means of a second hinged flexible thin wall 600b. The cover plate 620 laterially carries sector walls 619. A curved wall 621 is sealingly connected at its side edges to the arcuate edges and at its upper edge of the cover plate 620, refer to FIG. 30.

By means of the first and second hinged flexible thin wall 600a, 600b and the strip 617a, the cover portion 606 is foldable to the box portion 601 so that it is possible to close the opening 616 by the cover plate 620, refer to FIG. 30.

Figure 31:
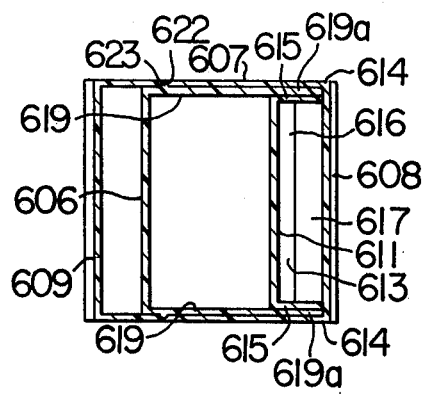
Figure 33:
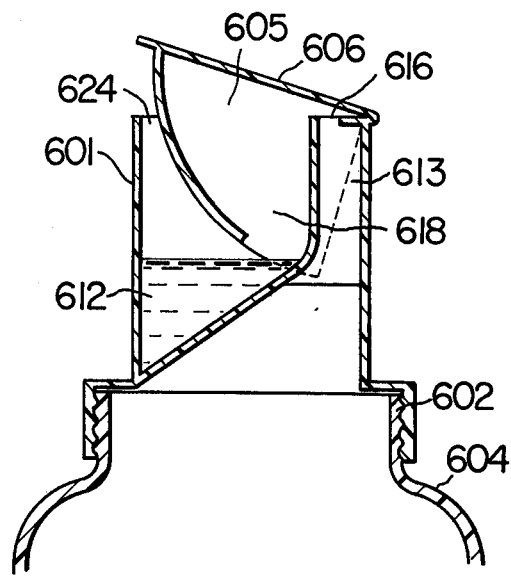

Due to the above construction, the sector walls 619 are inset in the respective gaps 614 so that each sector wall 619 sealingly cooperates with the lateral plate 615 and the side wall of the box portion 601, refer to FIG. 31.

Figure 34:
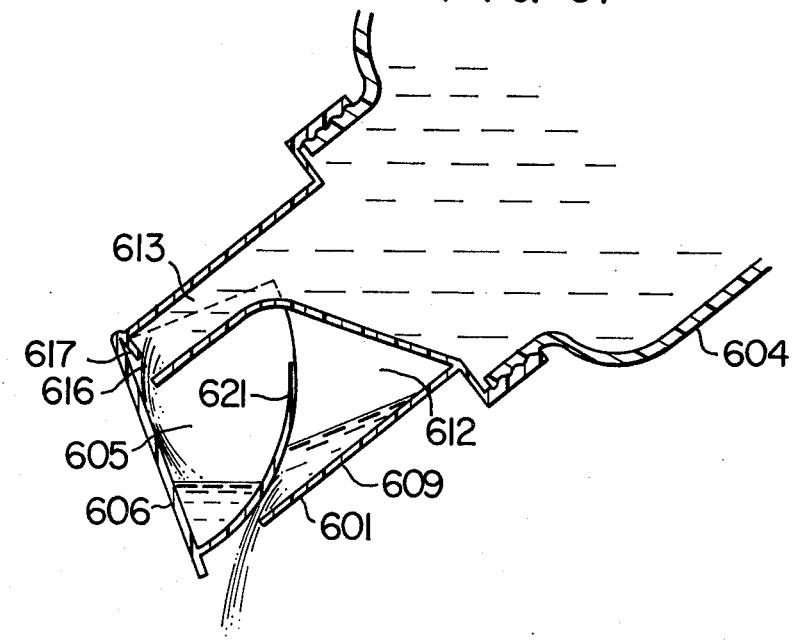

Referring to FIGS. 32 and 34, the sector walls 619, the curved wall 621 and the cover plate 620 define together a first chamber 605 into which the content flows from the container 604 through the opening 616 when the container is turned upside down. The side walls of the box portion 601 and the inclined and vertical walls 610 and 611 define together a second chamber 612 into which the content within the first chamber 605 flows through a restricted opening defined between the edge 618 of the curved wall 621 and the inclined wall 610 when the container 601 is returned to its normal attitude from the upside down state.

It is appreciated that the adjustment of the degree of inserting the sector wall 619 into the respective gaps 614, may vary the amount of the fixed volume to be discharged.

It is preferable to provide projections 623 and recesses 622 on the outer surface of the sector walls 619 and the inner surfaces of the lateral walls of the box portion 601, respectively, so as to enable step change of the amount of the fixed volume to be discharged.

While preferred embodiments of the invention have been described, such a description is for illustrated purpose only and it is to be understood that the changes and the variations may be made without departing from the spirit or scope of the following claims.

For example, the fixed volume discharge device according to the present invention may be made of any suitable material. However, the device is preferably made of a transparent material so as to be possible to check the condition of the content occupying the first and the second chamber 12 of the device.

Various modification in structure and function may be made by one skilled in the art to the disclosed embodiments without departing from the scope of the invention as defined by the claims.

What is claimed is:

1. A fixed volume discharge device adapted to be mounted to the opening of a container, comprising:
   i. mounting means cooperating with the opening of a container;
   ii. communicating means for passing a content stored in the container;
   iii. a first chamber communicating with the inside of the container through said communicating means;
   iv. passage means provided in the lower most portion of said first chamber;
   v. a second chamber communicating with said first chamber through said passage means, said second chamber being positioned just under said first chamber; and
   vi. outlet means arranged above said second chamber, for discharging the content in a predetermined amount trapped in said second chamber;
   wherein said device consists of an outer lower cylinder adapted to be sealingly fitted onto the neck portion of the container, having a lower wall connected at its periphery to the inner surface of said outer lower cylinder and inner cylinder vertically extending from a hole defined in the middle portion of said lower wall, and an overcap adapted to cooperate with said outer lower cylinder, having a top plate carrying a conduit slidably fitted onto said inner cylinder, said conduit having at least one hole in its peripheral surface adjacent to said top plate, said first chamber being defined in said over cap, said second chamber being defined in said outer lower cylinder between the peripheral surface of said inner cylinder and inner surface of said outer cylinder, said communicating means being defined in said inner cylinder, and said outlet means being an opening defined between the lower peripheral edge of said over cap and the upper peripheral edge of said outer lower cylinder when said over cap is pulled out from said outer lower cylinder.

2. A fixed volume discharge device as set forth in claim 1, wherein the device further comprises a conical wall having its larger diameter end connected to the lower peripheral edge of said over cap and defining at its smaller diameter end, with the outer peripheral surface of said inner cylinder, said passage means.

3. A fixed volume discharge device as set forth in claim 1, wherein said over cap is threadedly engaged with said outer lower cylinder.

4. A fixed volume discharge device as set forth in claim 1, wherein said conduit is engaged with said inner cylinder by means of annular projections and annular recesses respectively provided therein.

5. A fixed volume discharge device as set forth in claim 1, wherein said inner cylinder is threadedly engaged with said conduit.

6. A fixed volume discharge device as set forth in claim 1, the upper end of said inner cylinder is slantly cut out so as to obtain a smooth flow of the content when the container is turned upside down.

7. A fixed volume discharge device as set forth in claim 1, wherein said inner cylinder is formed with two rectilinear holes opposite to each other at a portion adjacent to the top plate, said respective rectilinear holes having its lower edges, which are remote from said top plate, of different levels.

* * * * *